United States Patent [19]

Wang

[11] Patent Number: 5,139,360
[45] Date of Patent: Aug. 18, 1992

[54] CONNECTOR FOR DISPLAY SHELVING

[76] Inventor: Chin-Ming Wang, No. 597, Pei Sheh Wei, Chiayi City, Taiwan

[21] Appl. No.: 804,408

[22] Filed: Dec. 10, 1991

[51] Int. Cl.$^5$ .............................................. E04G 17/04
[52] U.S. Cl. .................................. 403/396; 403/391; 211/182
[58] Field of Search ............... 403/396, 391; 211/182, 211/184, 181

[56] References Cited

U.S. PATENT DOCUMENTS

| | | | |
|---|---|---|---|
| 526,123 | 9/1894 | Boots et al. | 403/396 |
| 2,013,437 | 9/1935 | Farrell | 403/391 X |
| 2,044,679 | 5/1936 | Frese | 403/391 X |
| 2,795,770 | 6/1957 | Toedtman | 403/391 X |
| 3,044,807 | 7/1962 | Brisse | 403/396 |
| 3,097,258 | 7/1963 | Modrey | 403/391 X |
| 3,677,584 | 7/1972 | Short | 403/396 X |
| 3,945,291 | 3/1976 | Zickos | 403/391 X |
| 4,171,838 | 10/1979 | Grundy | 403/391 X |
| 4,958,793 | 9/1990 | Hess | 403/396 X |

Primary Examiner—Carl D. Friedman
Assistant Examiner—Korie H. Chan
Attorney, Agent, or Firm—Bacon & Thomas

[57] ABSTRACT

A connector for display shelve comprises a round and flat first block, a corresponding second block, and a pin member. The first block includes a semicircle trough on top portion and one side thereof extending downward, a semicircle recess horizontally lying underneath the trough having a convexity at center portion which has a through hole in parallel with the recess, a semicircle groove, horizontally, lying underneath the recess, and two notches on two sides of the periphery. The second block has a semicircle trough, and a semicircle groove in corresponding to the trough and the groove of the first block both in size and location. The second block has further two convexities at respective end of center line having a through hole in each of the convexities, and a concavity located inbetween the two convexities and is corresponding to the convexity of the first block. Thus when the two blocks are connected together by means of the pin member and the grooves of the first and the second blocks have clamped the mainframe, the connector is slidable. When the connector has slid into a desired position, the supporting frames and partition frames are installed into the grooves.

2 Claims, 4 Drawing Sheets

CONNECTOR FOR DISPLAY SHELVING

FIELD OF INVENTION

This invention relates to a connector. More particularly, a connector for detachably secured on display shelve.

BACKGROUND OF PRIOR ART

Shelves presently being used by grocery stores or supermarket to display goods are mostly comprising a plurality of solid bars being connected either by wire or by clamps to form a basic (main) frame having partitioned into several small areas, a plurality of glasses or short bars being placed on top of each small area of the frame as a base for goods to be displayed to stand thereon. The outer edges of the main frame are bent upward to prevent display goods from sliding down or dropping off. However, such shelves are not convenient both in assemble or disassemble when it is desired to adjust the space of each small area. For instance, if an item has a large amount to display, subsequently, a large space is required to display such quantities. Upon most of the item on the display shelve been sold from the shelve, the manager will not still keep the small amount of the item taking a lot of display space and therefore, he will either replenish with more quantities of the item or move the item to a smaller display space or readjust the partitions of the shelve in order to spare more space for other items. This alteration would take a lot of time to untight the wire or clamps.

Owing to this reason and the others, the inventor has invented the present invention which is easy to operate and saves time.

SUMMARY OF THE INVENTION

It is the primary object of the present invention to provide connectors for display shelve which are easy manageable.

It is another object of the present invention to provide connectors for display shelve which are easy to adjust each display space.

It is a further object of the present invention to provide connectors for display shelve which are inexpensive to produce.

It is still a further object of the present invention to provide connectors for display shelve which are easy to operate.

DETAILED DESCRIPTION OF THE PREFERRED EMBODIMENT

Figure 1:
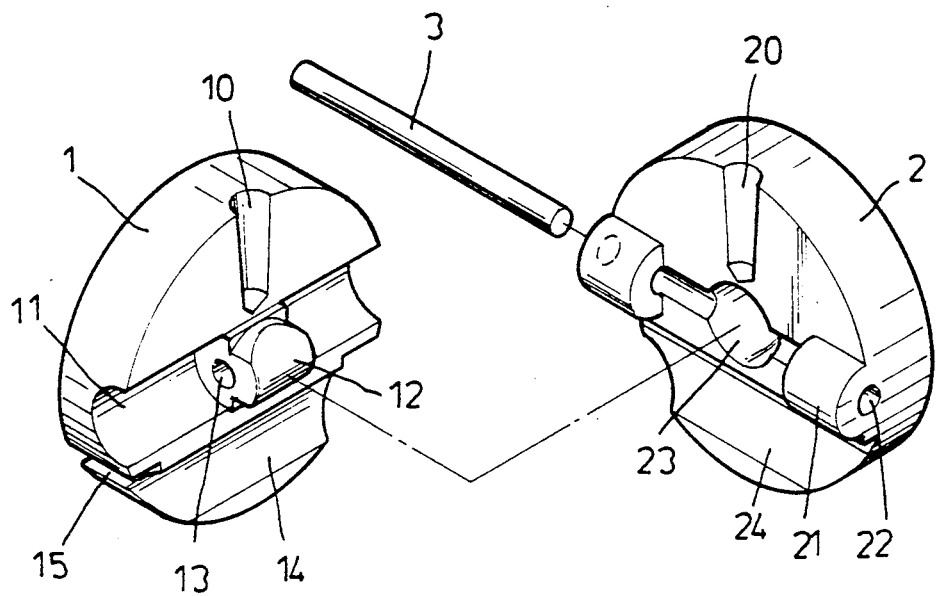
FIG. 1 is a fragmentary view of the present invention.

Reference now made to FIG. 1, the present invention comprises an integral left block 1 and an integral right block 2 each of which corresponds to one another and a pin member 3.

The left block 1, round and flat in shape, has a trough 10, a recess 11, a groove 14 located at one side of the block 1, and two notches 15 located on the periphery.

Both the trough 10, the recess 11, and the groove 14 are in semicircle shape. The trough 10 is located on top portion extending downward with its bottom close to the center line. The further the trough 10 is extending down, the smaller the size of the trough 10 is. The recess 11 being horizontally lain across the center portion of the block 1 has a convexity 12 at middle having a hole 13 therethrough in parallel with the recess 11. The groove 14 in parallel with the recess 11 is located at the bottom portion of the block 1 adjacent to the recess 11. Two notches 15 are located on the periphery above the two ends of the groove 14 of the block 1.

The right block 2, round and flat in shape, includes a trough 20, two convexities 21, a concavity 23, and a groove 24 all at one side. The trough 10, semicircle in shape, is located on top portion and corresponding to the trough 10 both in shape and in location. The two convexities 21 are located at two sides of the center line having a hole 22 therethrough of each of the convexities 21. The concavity 23 is located inbetween two convexities 21 and underneath the trough 20. The two convexities 21 are in symmetrical to the recess 11 of block 1 whereas the concavity 23 is in symmetrical to the convexity 12 of block 1. The groove 24, semicircle in shape, is located at the bottom portion adjacent to the bottom edges of the convexities 22 and the concavity 23, and is corresponding to the groove 14 of the block 1.

Figure 2:
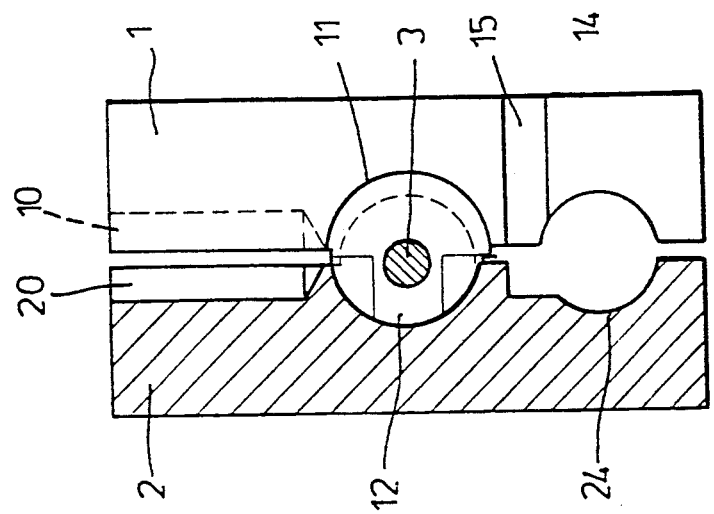
FIG. 2 is a sectional view of the present invention.

Upon the left and the right blocks 1 & 2 are connected together by means of a pin member 3 inserting therethrough the pin holes 22 & 13, as shown in FIG. 2, the two recess 10 & 20 are formed and shaped like a cone, and the bottom portion of the grooves 14 & 24 are in round hole.

Figure 3:
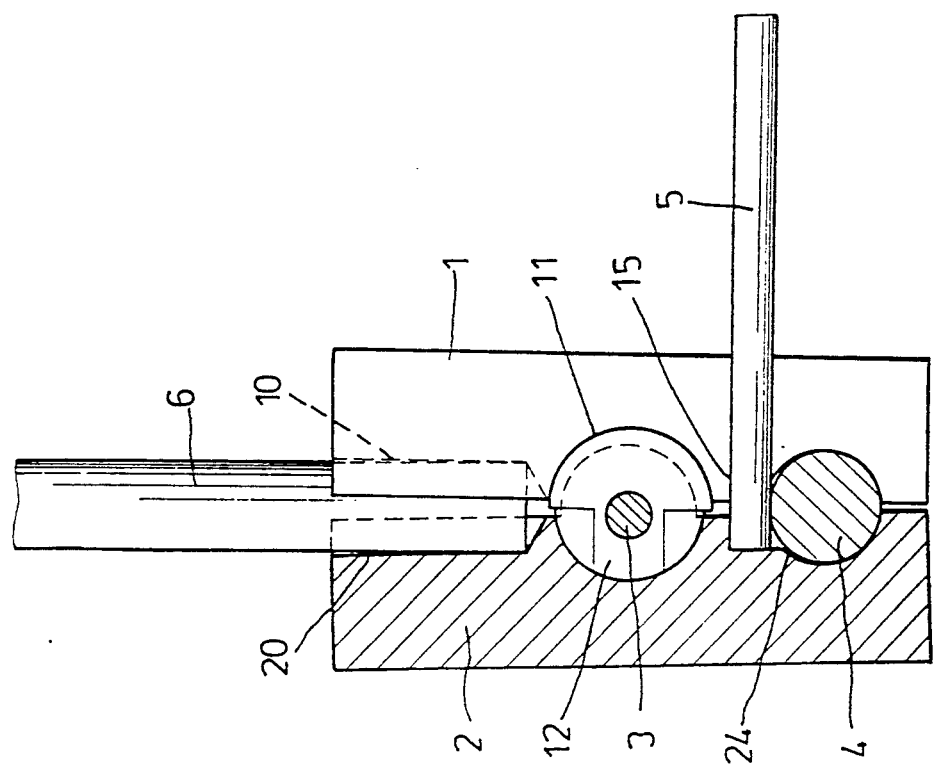
FIG. 3 is another sectional view of the present invention having frames installed.
Figure 4:
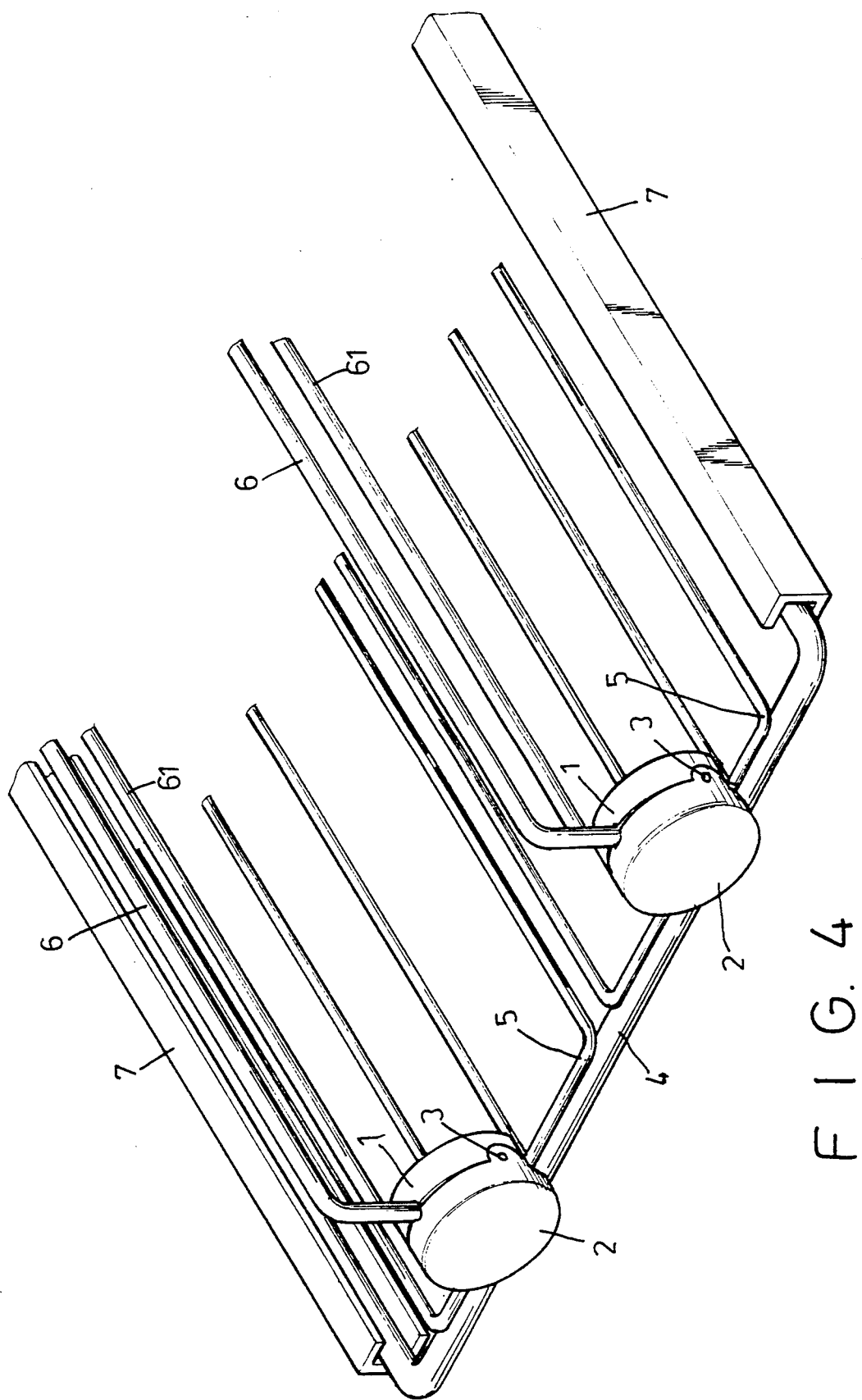
FIG. 4 is a perspective view of the present invention having installed with frames.
Figure 5:
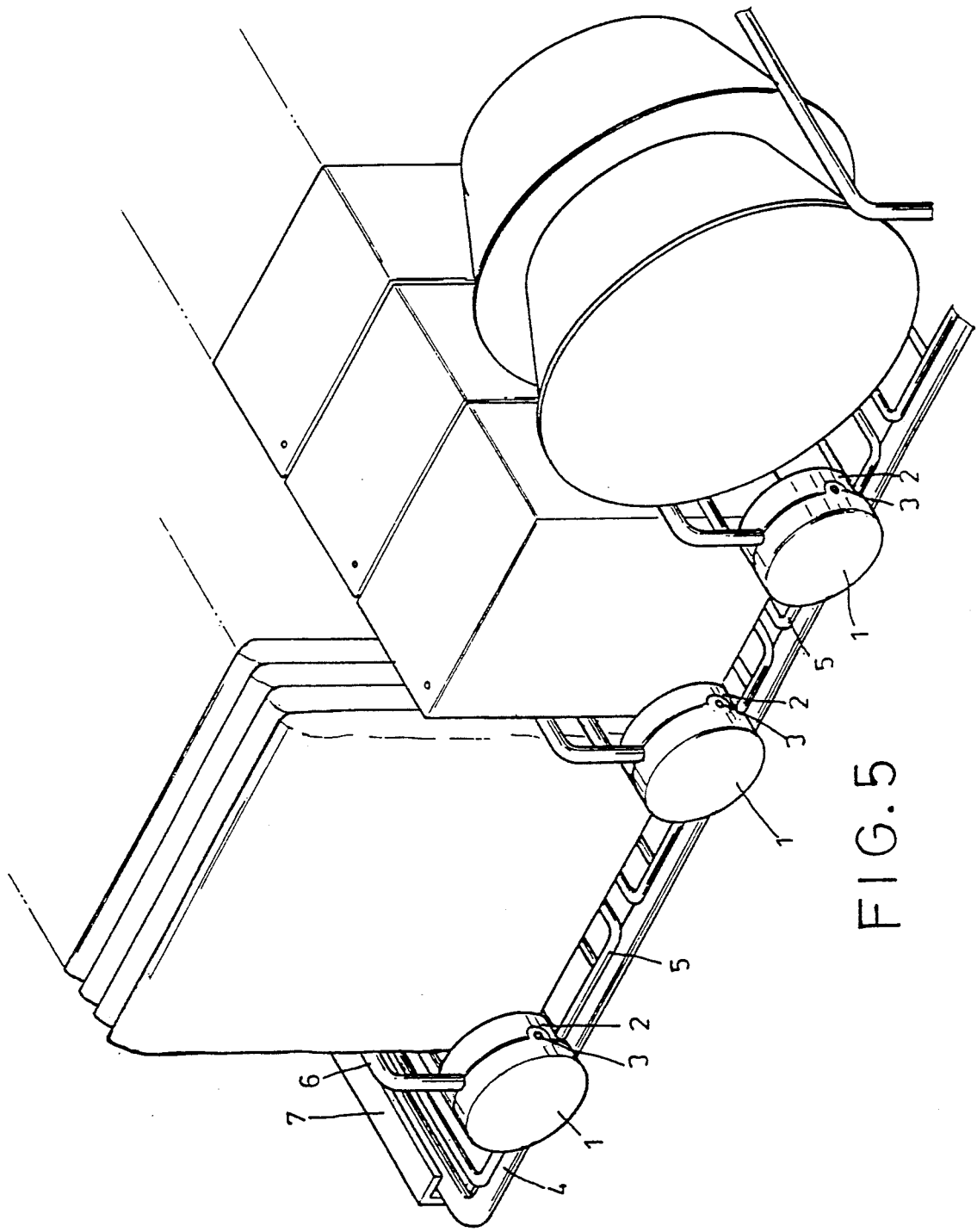
FIG. 5 is a perspective view of FIG. 4 having goods displayed on the shelve.

When in use, clamp the main frame 4 with the grooves 14 & 24, as shown in FIGS. 3 & 4, then insert the pin member 3 through the pin holes 13 & 22 to connect the two blocks 1 & 2 together, and slide to a desired position then insert the supporting frames 5 into the notches 15, respectively, and insert partition frame 6 into the cone shaped blind hole which is formed by the combination of the two troughs 10 & 20. The deeper the partition frame 6 is inserted therein, the wider the upper portion of the connector will spread away, and the tighter the bottom portion of the connector will be. Thus the connector of the present invention is limited from moving or sliding freely. When it is desired to adjust the partition spaces of the shelve, simply pull the partition frame 6 out of the upper hole and the supporting frames 5 out of the notches 15, the connector is able to slide on the main frame 4 of the shelve freely and upon the connector has reached to the desired position, by repeating aforementioned steps to secure the supporting and the partition frames 5 & 6 to the connector and the display shelve is ready for use.

I claim:

1. A connector for display shelving comprising;
an integrally formed first block being of a round and flat shape and including a center line, having a trough semicircular in shape being located on a top portion of one side of said first block and extending downwardly therefrom, a recess being horizontally lain across said center line and being located underneath said trough, said center line also having a convexity at a center portion thereof with a through hole in parallel with said recess, a groove being located at a second side underneath said one side and in parallel with said recess, and two notches being located on the periphery and above respective end of said groove;

an integrally formed second block being of a round and flat shape having a center line, and including a trough being located on a top portion of one side of said second block and extending downwardly therefrom, said trough corresponding both in size and location to said trough of said first block, two convexities at respective end of the center line of said second block having a through hole in each said convexity, a concavity being located inbetween said two convexities and in symmetry to said convexity of said first block, a groove being located underneath and in parallel with the bottom edges of said convexities and said concavity of said second block, said groove of said second block corresponding both in size and location to said groove of said first block, whereby the first and second block are connected together by means of a pin member inserted through the through holes in said convexities.

2. A connector for display shelve of claim 1, wherein upon clamping onto a main frame, said connector being freely slidable on said main frame to a desired position where a plurality of supporting frames and a partition frame are securely inserted into said connector.

* * * * *